(12) United States Patent
Baccouche et al.

(10) Patent No.: US 10,150,440 B2
(45) Date of Patent: Dec. 11, 2018

(54) RESTRAINTS CONTROL MODULE ATTACHMENT ASSEMBLY

(71) Applicant: Ford Global Technologies, LLC, Dearborn, MI (US)

(72) Inventors: Mohamed Ridha Baccouche, Ann Arbor, MI (US); Saied Nusier, Canton, MI (US); David James Bauch, South Lyon, MI (US); Mahmoud Yousef Ghannam, Canton, MI (US); Jhony J. Barbosa, Hamburg, NY (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/975,532

(22) Filed: May 9, 2018

(65) Prior Publication Data

US 2018/0257595 A1  Sep. 13, 2018

Related U.S. Application Data

(63) Continuation-in-part of application No. 15/159,242, filed on May 19, 2016.

(51) Int. Cl.
| | | |
|---|---|---|
| F16M 13/00 | (2006.01) | |
| B60R 21/02 | (2006.01) | |
| B60R 21/20 | (2011.01) | |

(52) U.S. Cl.
CPC .............. B60R 21/02 (2013.01); B60R 21/20 (2013.01)

(58) Field of Classification Search
USPC ........................................................ 248/548
See application file for complete search history.

(56) References Cited

U.S. PATENT DOCUMENTS

| | | | |
|---|---|---|---|
| 4,218,724 A | | 8/1980 | Kaufman |
| 4,481,525 A | * | 11/1984 | Calabro .............. H01L 23/4093 174/16.3 |
| 4,636,580 A | | 1/1987 | Neidig et al. |
| 5,008,487 A | * | 4/1991 | Shimmyo ............ H05K 5/0008 174/353 |
| 5,398,157 A | | 3/1995 | Paul |
| 5,650,567 A | * | 7/1997 | Ueda ....................... G01P 1/023 73/493 |
| 5,819,592 A | | 10/1998 | Lewandowski et al. |
| 5,950,973 A | | 9/1999 | Verma |

(Continued)

FOREIGN PATENT DOCUMENTS

| | | |
|---|---|---|
| JP | 2011234494 A | 11/2011 |
| JP | 2011234495 A | 11/2011 |

*Primary Examiner* — Monica E Millner
(74) *Attorney, Agent, or Firm* — Jason Rogers; Brooks Kushman P.C.

(57) ABSTRACT

A restraints control module (RCM) assembly attached to the tunnel in the floor of a vehicle. The bracket includes a base plate supporting the restraints control module. A helmet shield is secured over the RCM and encloses the RCM on three sides. The helmet shield includes slots that extend downwardly and outwardly from opposite side of the helmet shield that receive a plurality of bolts as the helmet shield is moved in a vertically downward direction. Two vertically extending sidewalls of the helmet shield are assembled over the RCM with a clearance being defined between the sidewalls and the RCM. The helmet shield is adapted to protect the RCM in a side impact collision.

8 Claims, 5 Drawing Sheets

(56) References Cited

U.S. PATENT DOCUMENTS

| | | |
|---|---|---|
| 6,520,357 B1 | 2/2003 | Kautz et al. |
| 6,728,110 B2 * | 4/2004 | Koyama ............... H05K 5/0073 361/752 |
| 6,816,381 B2 * | 11/2004 | Takeuchi ............. H05K 7/1417 174/50 |
| 7,051,825 B2 * | 5/2006 | Masui ..................... B60K 1/04 180/65.1 |
| 7,078,620 B2 * | 7/2006 | Ikeda ..................... B60R 11/02 174/50 |
| 7,244,141 B2 * | 7/2007 | Yamane ................. H05K 7/026 361/719 |
| 7,255,597 B2 * | 8/2007 | Nakamura ........... H05K 5/0073 439/535 |
| 7,291,023 B1 * | 11/2007 | Still ........................ B60R 21/01 439/65 |
| 7,424,347 B2 | 9/2008 | Babala et al. |
| 7,510,404 B2 * | 3/2009 | Koyama ............. B60R 16/0215 180/400 |
| 7,651,132 B2 | 1/2010 | Cho et al. |
| 7,654,864 B2 | 2/2010 | Ishiguro et al. |
| 8,096,576 B2 | 1/2012 | Azuma |
| 8,269,103 B2 | 9/2012 | Kiyota |
| 8,338,720 B2 * | 12/2012 | Burgi ................... H05K 5/0073 174/541 |
| 8,387,457 B2 * | 3/2013 | Snider .................... G01P 1/023 73/431 |
| 8,549,741 B2 * | 10/2013 | Nelson .................... H04B 1/38 29/592.1 |
| 8,824,151 B2 | 9/2014 | Ghannam et al. |
| 8,830,686 B2 * | 9/2014 | Nomoto ............... H05K 5/0078 361/752 |
| 8,842,437 B2 * | 9/2014 | Chang .................... G06F 1/181 165/185 |
| 9,139,074 B2 * | 9/2015 | Jarocki .................... B60K 1/04 |
| 9,227,585 B1 | 1/2016 | Barbat et al. |
| 9,293,870 B1 | 3/2016 | Koczwara et al. |
| 9,320,156 B2 * | 4/2016 | Ohmoto ............... H05K 5/0078 |
| 9,381,936 B2 | 7/2016 | Tanaka et al. |
| 9,610,902 B2 | 4/2017 | Rapa, Jr. et al. |
| 9,944,243 B2 * | 4/2018 | Nusier ................... B60R 21/01 |
| 2003/0205006 A1 | 11/2003 | Conner et al. |
| 2006/0046535 A1 * | 3/2006 | Iida ..................... H05K 5/0069 439/76.1 |
| 2006/0049620 A1 | 3/2006 | Lee |
| 2013/0205560 A1 | 8/2013 | Ghannam et al. |
| 2014/0353457 A1 | 12/2014 | Ohmoto et al. |
| 2016/0031382 A1 | 2/2016 | Chinn et al. |
| 2016/0221512 A1 | 8/2016 | Goodrich |

\* cited by examiner

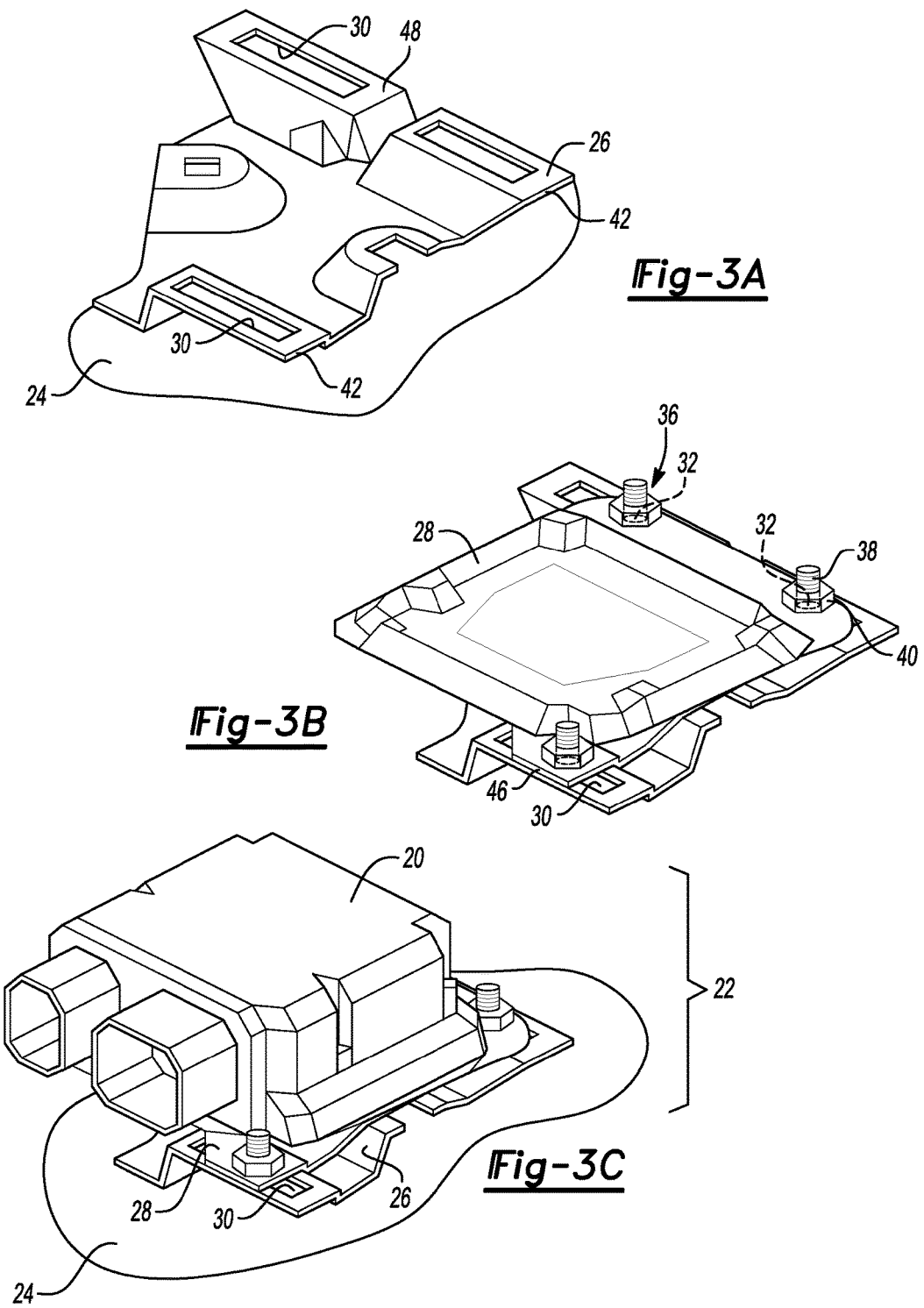

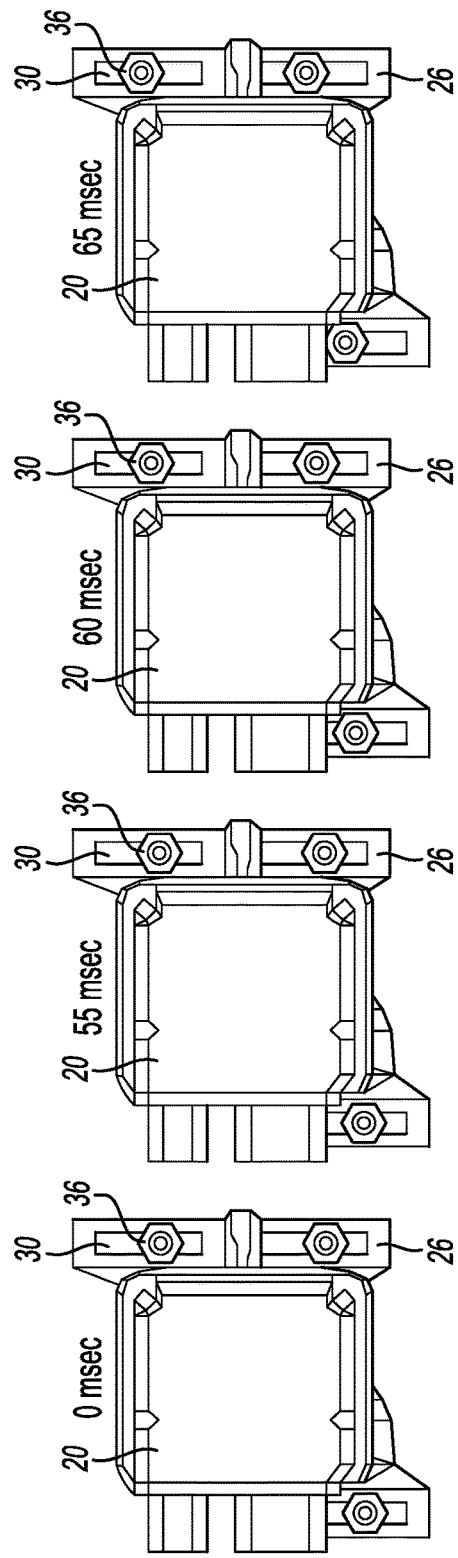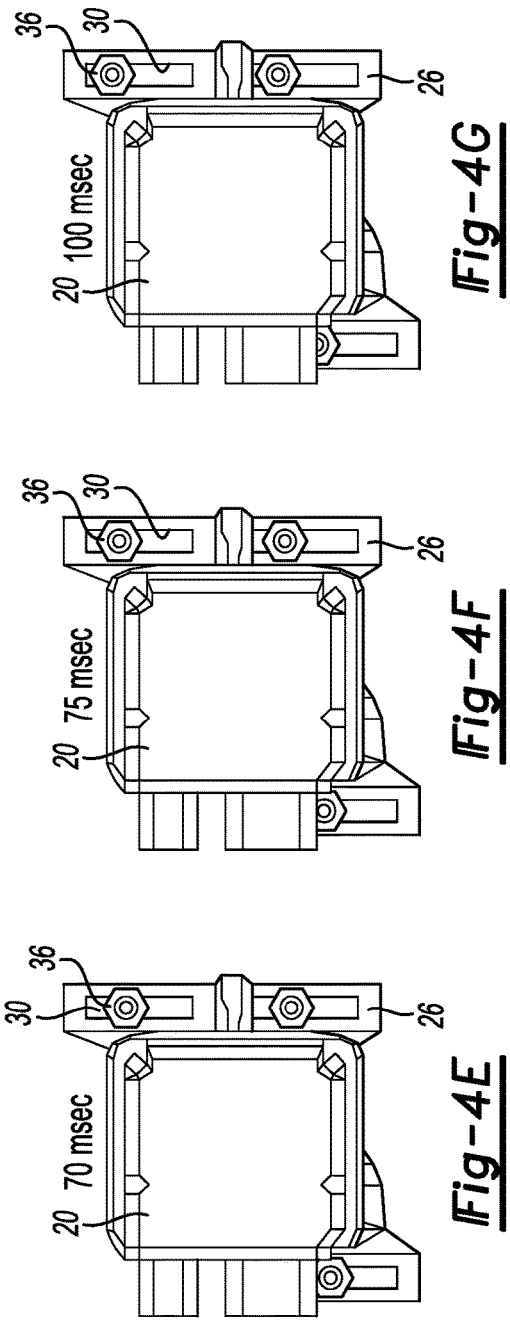

RESTRAINTS CONTROL MODULE ATTACHMENT ASSEMBLY

REFERENCE TO RELATED APPLICATIONS

This application is a continuation-in-part of U.S. application Ser. No. 15/159,242 filed May 19, 2016, the disclosure of which is hereby incorporated in its entirety by reference herein.

TECHNICAL FIELD

This disclosure relates to a mounting arrangement for a vehicle restraints control module that is attached to the tunnel or floor of a vehicle between the two front seats inside the passenger compartment.

BACKGROUND

Vehicle restraint control modules are used to control deployment of air bags or other types of safety restraints during a collision. Restraint control modules must be protected to accurately and timely deploy safety restraints. Damage to the restraints control module in a severe collision can cause the module to break or be damaged. A broken restraints control module may result in an unplanned deployment or may affect deployment timing.

Vehicles are tested in a wide variety of collision tests. As shown in FIG. 1, one type of test is the 75° Oblique Left Side Test in which a vehicle 10 is driven on a movable cart into a 10 inch pole 12 at 20.7 mph. As shown in FIG. 2, less than 10 cm of spacing may be provided between the seat track 14 and the restraints control module 16. The seat tracks 14 securing the front seats of the vehicle 10 to the floor 18 may become detached/deformed and if they move more than 10 cm may cause damage to the restraints control module 16 that is attached to the floor 18 between the seats.

The above problems and other problems are addressed by this disclosure as summarized below.

SUMMARY

According to one aspect of this disclosure, a restraints control mounting assembly is disclosed for attaching a restraints control module (RCM) to a tunnel of a vehicle. The mounting assembly comprises a base plate attached to the tunnel that receives the RCM and a helmet shield attached to the base plate and enclosing the RCM on at least two sides.

According to other optional aspects of this disclosure, the helmet shield may define downwardly and laterally extending slots on opposite sides of the helmet shield and a plurality of fasteners may extend outwardly and upwardly from the base plate with the slots receiving the fasteners to secure the helmet shield to the base. The RCM may be secured to the base by fasteners extending upwardly from the base that are accessible outside the helmet shield when the helmet shield is assembled to the base.

The helmet shield may include a vertically extending wall on opposite sides of the RCM and a clearance may be defined between the RCM and the vertically extending walls when the helmet shield is secured over the RCM.

The restraints control mounting assembly may have a base plate that includes a recessed portion that is flanked by two raised portions and the recessed portion and the two raised portions may be assembled to a top surface of the tunnel. The restraints control mounting assembly may further comprise a plurality of fasteners attached to the raised portions extending vertically upwardly from the raised portions and the RCM is adapted to be secured to the fasteners. The recessed portion is adapted to be welded to the tunnel.

According to another aspect of this disclosure, a method is disclosed for assembling a RCM to a vehicle. The method comprises assembling a plate to a tunnel that includes a first plurality of bolts extending vertically upwardly and second plurality of fasteners extending upwardly and outwardly from right and left sides of the tunnel, securing the RCM to the plate on the first plurality of fasteners, and securing a helmet shield to the plate on the second plurality of fasteners and partially enclosing the RCM. According to other aspects of this disclosure as it relates to the method, the helmet shield may define downwardly and laterally extending slots on opposite sides of the helmet shield and the step of securing the helmet shield may further comprise sliding the first plurality of fasteners vertically into the slots, and securing the helmet shield to the base on the fasteners.

The helmet shield may include vertically extending walls on opposite sides of the RCM and the method may further comprise assembling the helmet shield over the RCM with a clearance being defined between the RCM and the vertically extending walls on opposite sides of the RCM.

The method may further comprise welding the recessed portion to the tunnel.

The above aspects of this disclosure and other aspects are described below with reference to the attached drawings.

BRIEF DESCRIPTION OF THE DRAWINGS

FIG. 3A is a perspective view of a base plate.

FIG. 3B is a perspective view of an intermediate plate attached to a base plate.

FIG. 3C is a perspective view of a bracket/restraints control module (RCM) assembly shown attached to a tunnel in a vehicle.

FIGS. 4A-4G are top plan views of a RCM attached to a bracket/RCM assembly during a side impact collision. The sequence of views is shown progressively at different times following a collision.

DETAILED DESCRIPTION

Figure 1:
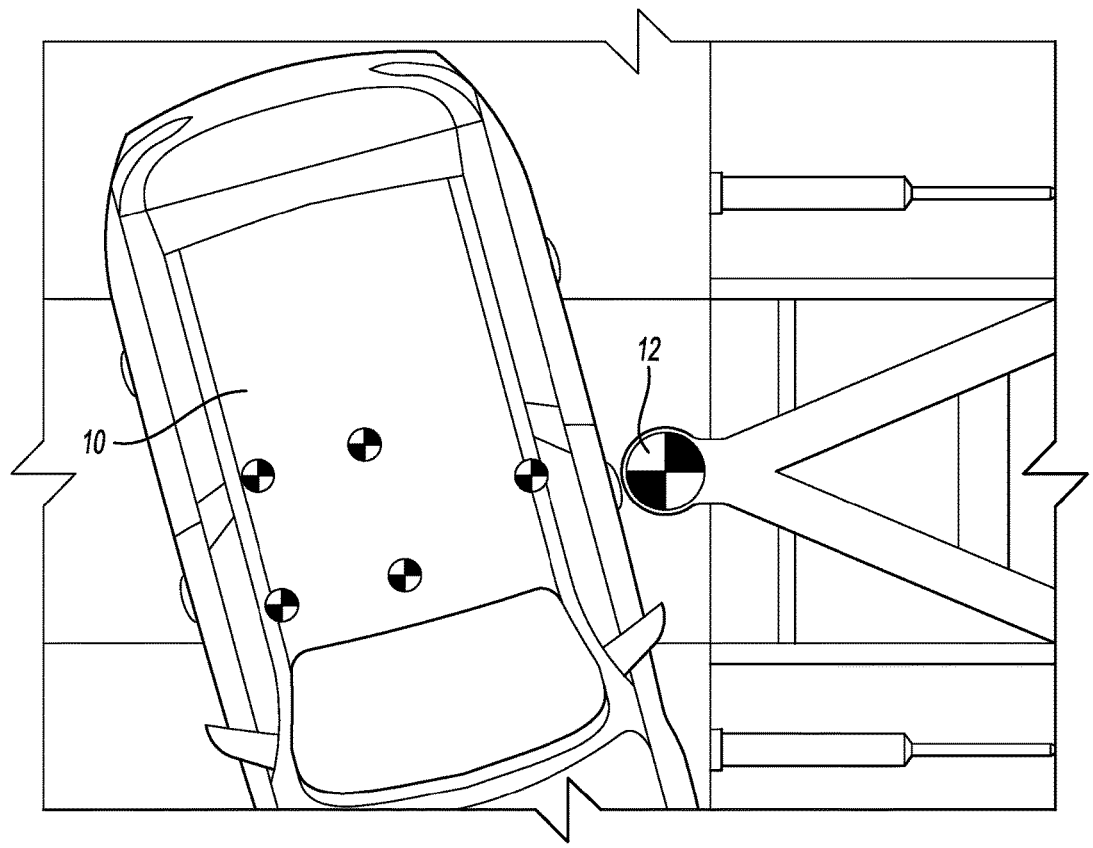
FIG. 1 is a fragmentary diagrammatic view of a 75° oblique left side test showing a vehicle being driven on a movable cart into a 10 inch pole.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIGS. 3A-3C, a restraints control module (hereinafter RCM) 20 is shown in a bracket/RCM assembly 22 that is adapted to be attached to the tunnel 24, or central portion of the vehicle floor. The bracket/RCM assembly 22 includes the RCM 20, a base plate 26, or base, and an intermediate plate 28, or plate.

Referring to FIG. 3A, the base plate 26 is attached to the tunnel 24 of the vehicle by conventional fastening techniques, such as welding, bolts, rivets, screws and the like.

The intermediate plate 28, best shown in FIG. 3B, is attached to the base plate 26. The base plate 26 includes a plurality of slots 30. The slots 30 are elongated slots that are elongated in the transverse or cross-vehicle direction. The intermediate plate 28 includes a plurality of holes 32 that are aligned with the slots 30 in the base plate 26. It should be understood that the slots 30 and holes 32 could be provided in the intermediate plate 28 and base plate 26, respectively.

A limited slip connector assembly 36 is inserted through the slots 30 and holes 32. The limited slip connector assembly 36 includes an externally threaded fastener, such as a bolt 38, and an internally threaded fastener 40, such as a nut.

The base plate 26 and intermediate plate 28 each include planar flanges 42. The slot 30 and hole 32 are provided in the planar flanges 42. The planar flanges 42 include a lower slide surface 46, or flat surface, that is provided on the intermediate plate 28. An upper slide surface 48, or flat surface, is provided on the planar flanges 42 of the base plate 26.

Figure 2:
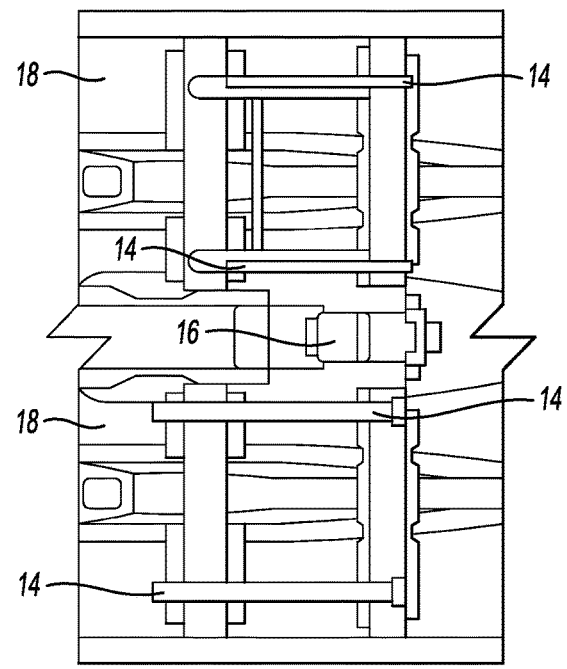
FIG. 2 is a fragmentary diagrammatic view of the front seat tracks and a restraints control module attached to the floor of a passenger compartment between the two front seats of a vehicle.

The limited slip connector assembly 36 may be tightened to a predetermined pre load level of between 3,000 and 10,000 pounds depending upon the fastener material, size and threads. The limited slip connector assembly 36 allows the RCM 20 and intermediate plate 28 to slip in a collision when the force of an impact of an object with the bracket/RCM assembly 22 exceeds a predetermined threshold level. When the restraints control module 20 slides on the intermediate plate 28 relative to the base plate 26, the RCM 20 slides further away from potential contact with objects, such as seat tracks (as shown in FIG. 2) that may become dislodged in the collision. By moving the bracket/RCM assembly 22 away from the collision, additional clearance is provided and the pulse applied to the RCM 20 is reduced.

Referring to FIGS. 4A-4G, the movement of the RCM 20 relative to the base plate 26 is shown. Initially, at 0 msec, the connector assembly 36 are shown in their normal, or as installed, position in the middle or intermediate area of the slots 30. It should be understood that the intermediate plate 28 is not shown in FIGS. 4A-4G to allow for better visibility of the movement of the connector assembly 36 relative to the slot 30.

Referring to FIG. 4B, initial movement of the RCM 20 is shown as the connector assemblies 36 begin to shift upwardly at the times shown in the view. Note, the upward direction denoted in FIGS. 4A-4G is actually the cross-car direction, or lateral direction. Referring to FIGS. 4C-4F, the connector assemblies 36 are shown to move progressively towards the upper end of the slots 30. As shown in FIG. 4G at 100 msec, the connector assemblies 36 have shifted relative to the slot 30.

Figure 5:
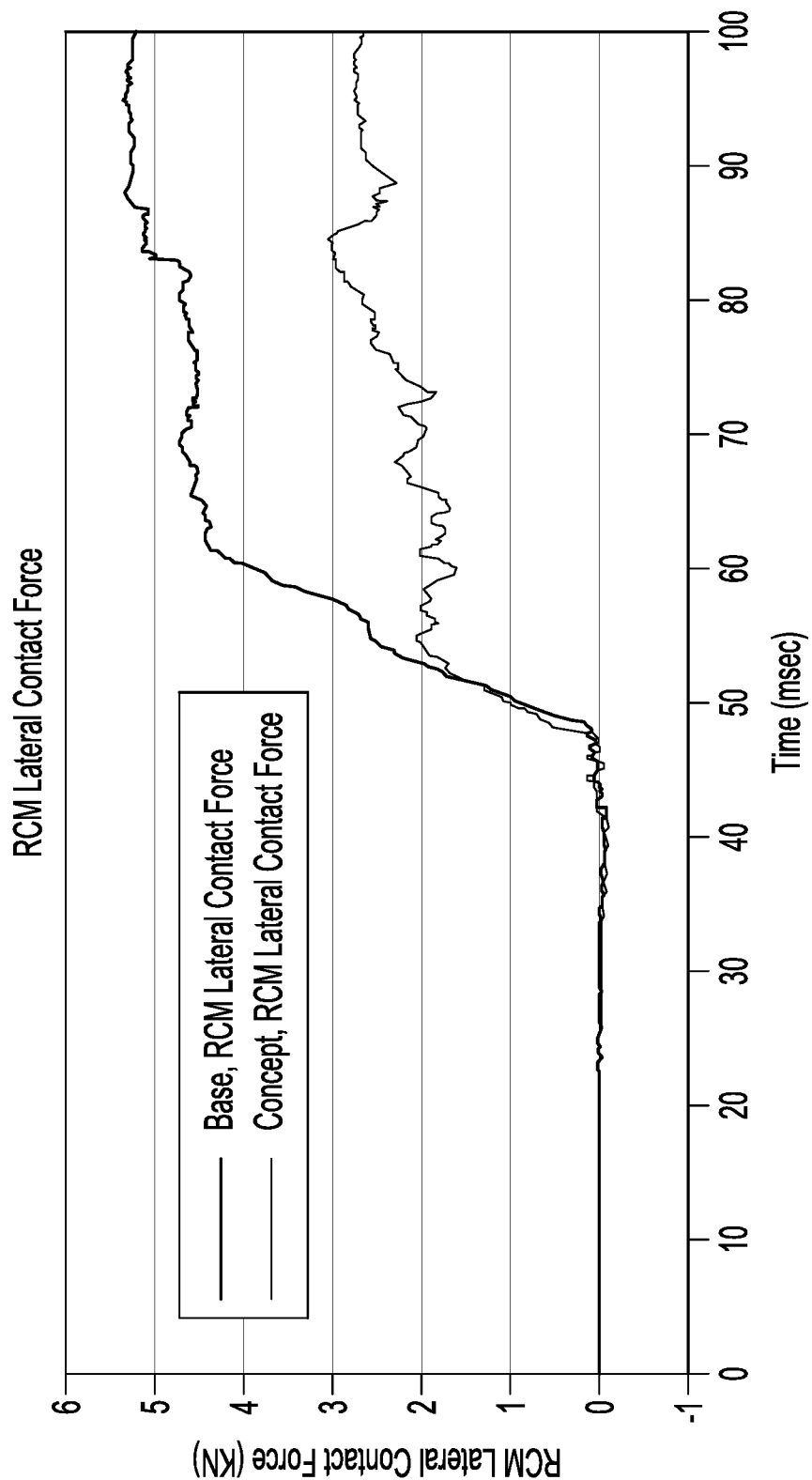
FIG. 5 is a chart of RCM lateral contact force comparing a base RCM to a bracket/RCM assembly made according to this disclosure.

Referring to FIG. 5, a chart showing the RCM lateral contact force is provided that illustrates the RCM lateral contact force in KN versus time in msec. In the collision, a lateral contact force applied to the RCM is initially zero. However, at or about 50 msec, the RCM is contacted by a seat track and a lateral impact force is applied. For the base, or prior art installation, the RCM lateral contact force rapidly increases to approximately 4.5 to 5.5 KN and may potentially result in damage to the RCM. In contrast, the concept RCM lateral contact force shown by the lower line in FIG. 5 reaches a level of between 2 and 3 KN. With a lateral contact force of between 2 and 3 KN, the possibility of damage to the RCM is substantially reduced.

Figure 6:
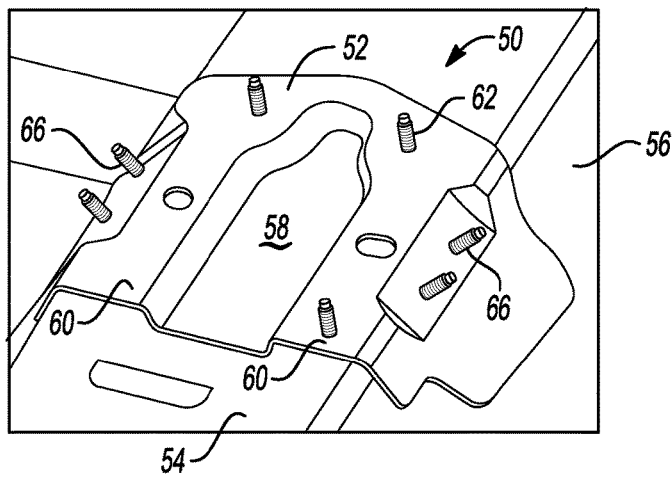
FIG. 6 is a perspective view of alternative embodiment of part of a protective RCM mounting assembly showing a base plate attached to a vehicle.

Referring to FIG. 6, an alternative embodiment of a protective RCM mounting assembly 50 is partially illustrated that shows a base plate 52 attached to the longitudinal center tunnel 54 of the vehicle 56. The base plate 52 includes an intermediate recessed portion 58 that is flanked on lateral sides by two raised portions 60. The recessed portion 58 is welded to the tunnel and the raised portions 60 provide clearance for bolts 62 that are provided for attachment of a RCM 64 (shown in FIGS. 7 and 8). Additional bolts 66 are provided on the base plate 52 on opposite lateral sides of the tunnel 54 that are provided to attach a helmet shield 68 (shown in FIGS. 7 and 8) to the base 52. The raised portions 60 also function to increase lateral stiffness of the base plate 52 and increase the resonant frequency of the RCM mounting assembly 50.

Figure 7:
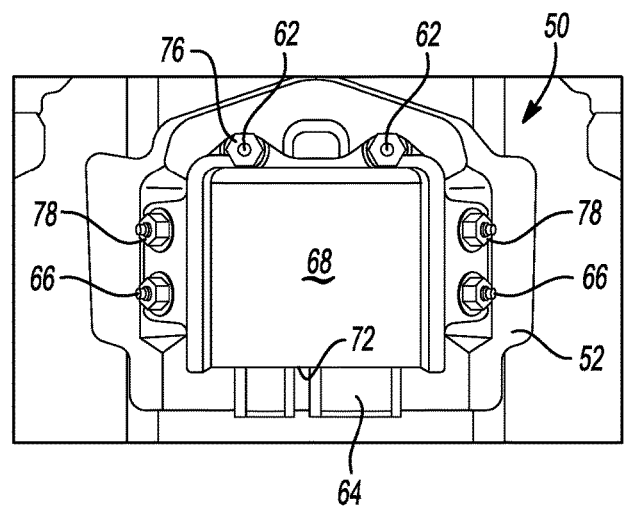
FIG. 7 is a rear perspective view according to the embodiment of FIG. 6 of a RCM attached to a base plate with a helmet shield enclosing three sides of the RCM.

Referring to FIG. 7, the RCM 64 is shown with the helmet shield 68 enclosing three sides of the RCM 64. The RCM 64 is secured by the bolts 62 to the base plate 52. Nuts and bolts as referred to herein are fasteners, as commonly referred to in the art. Other types of fasteners such as self-piercing rivets, flow drill screws, or the like could be substituted for nuts and bolts. The helmet shield 68 is assembled from above the RCM 64 in a downward vertical motion. Slots 70 (shown in FIG. 8) extend downwardly and laterally outward from opposite lateral sides of the helmet shield 68 to allow the bolts 66 to be received in the slots 70 as the helmet shield 68 is moved down vertically onto the base 52. The rearwardly open side 72 of the helmet shield 68 provides access to the electrical connectors for the ECM 64. Lateral clearance C is provided between the RCM 64 and a vertically extending wall 74 on both lateral sides of the helmet shield 68. The lateral clearance C provides relief for the helmet shield 68 to be deformed towards the RCM 64 in a side impact collision.

Figure 8:
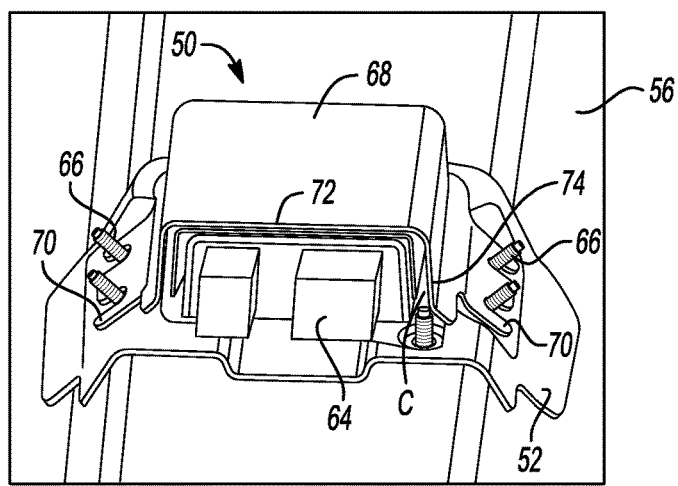
FIG. 8 is a top plan view of the embodiment of FIG. 6 showing the protective RCM mounting assembly attached to the vehicle.

Referring to FIG. 8, the protective RCM mounting assembly 50 is shown fully assembled to the tunnel 54 of the vehicle 56. The RCM 64 is shown attached to the base 52 by nuts 76 (shown in FIG. 7) tightened onto the bolts 62. Nuts 78 are tightened onto the bolts 66 to detachably secure the helmet shield 68 to the base 52. The helmet shield 68 protects the RCM 64 in the event of a side impact collision.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A restraints control mounting assembly for attaching a restraints control module (RCM) to a tunnel of a vehicle, comprising:

a base plate attached to the tunnel that receives the RCM; and a helmet shield attached to the base plate and enclosing the helmet shield on at least two sides, wherein the helmet shield defines downwardly and laterally extending slots on opposite sides of the helmet shield, and wherein a plurality of fasteners extend outwardly and upwardly from the base plate, wherein the slots receive the fasteners to secure the helmet shield to the base.

2. The restraints control mounting assembly of claim 1 wherein the RCM is secured to the base plate by fasteners extending upwardly from the base that are accessible outside the helmet shield when the helmet shield is assembled to the base.

3. The restraints control mounting assembly of claim 1 wherein the helmet shield includes a vertically extending wall on opposite sides of the RCM, and wherein a clearance is defined between the RCM and the vertically extending walls when the helmet shield is secured over the RCM.

4. A restraints control mounting assembly for attaching a restraints control module (RCM) to a tunnel of a vehicle, comprising:
  a base plate attached to the tunnel that receives the RCM;
  a helmet shield attached to the base plate and enclosing the helmet shield on at least two sides wherein the base plate includes a recessed portion that is flanked by two raised portions, and wherein the recessed portion and the two raised portions are assembled to a top surface of the tunnel wherein the recessed portion is welded to the tunnel; and
  a plurality of fasteners attached to the raised portions extending vertically upwardly from the raised portions, wherein the RCM is secured to the fasteners.

5. A method of assembling a RCM to a vehicle comprising:
  assembling a plate to a tunnel, the plate including a first plurality of fasteners extending vertically upwardly and second plurality of fasteners extending upwardly and outwardly from right and left sides of the tunnel;
  securing the RCM to the plate on the first plurality of fasteners; and
  securing a helmet shield to the plate on the second plurality of fasteners and partially enclosing the RCM.

6. The method of claim 5 wherein the helmet shield defines downwardly and laterally extending slots on opposite sides of the helmet shield, wherein the step of securing the helmet shield further comprises:
  sliding the first plurality of fasteners vertically into the slots; and
  securing the helmet shield to the base plate on the fasteners.

7. The method of claim 5 wherein the helmet shield includes vertically extending walls on opposite sides of the RCM, and the method further comprises:
  assembling the helmet shield over the RCM with a clearance being defined between the RCM and the vertically extending walls on opposite sides of the RCM.

8. The method of claim 5 further comprising:
  welding the recessed portion to the tunnel.

* * * * *